Jan. 31, 1939.  B. H. URSCHEL  2,145,466
ROCK DRILL
Filed May 25, 1937
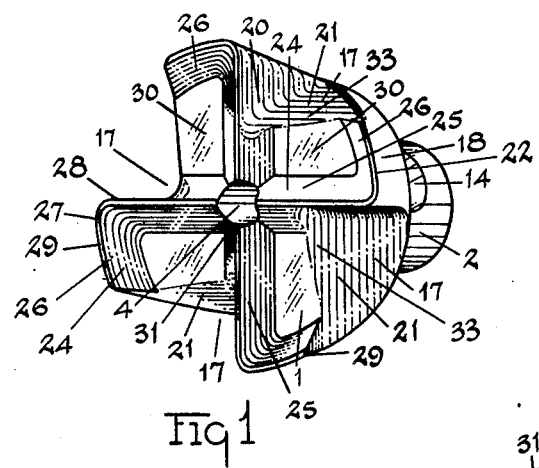
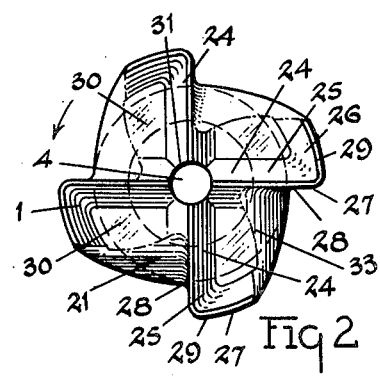
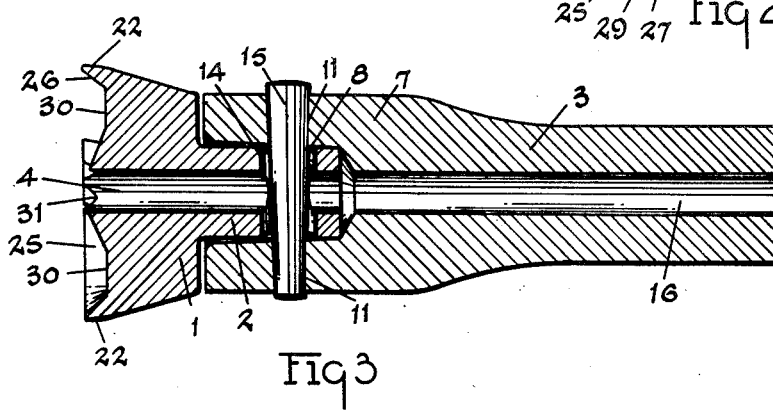
Inventor
Bertis H. Urschel Patented Jan. 31, 1939

2,145,466

UNITED STATES PATENT OFFICE 2,145,466

ROCK DRILL

Bertis H. Urschel, Bowling Green, Ohio

Application May 25, 1937, Serial No. 144,642

4 Claims. (Cl. 255—64)

My invention relates to rock drills. It particularly has for its object to provide a rock drill having cutting edges and rock crushing surfaces that, upon rotation and reciprocation of the drill, operates to break the larger rock pieces dislodged during the drilling and segregates the smaller rock particles and makes possible their discharge by water pressure.

The invention also particularly provides a rock drill having substantially axially and radially extending surfaces and coaxial cylindrical surfaces terminating in chisel cutting edges that may be readily sharpened by surface grinding the radially extending surfaces and the cylindrical surfaces.

The invention also particularly provides a rock drill having a conical head, the head having sloping and inwardly extending surfaces forming, when the head is located in a bored hole, lateral and upwardly extending passageways for water flushing the smaller particles from beneath the lower end of the drill.

The invention also particularly provides a drill head having outwardly and laterally extending surfaces and surfaces extending at right angles to the axis of the drill for crushing rock portions dislodged by the drill, the small rock particles being discharged through the lateral passageways formed by the surfaces of the drill and the hole by the drill.

The invention consists in other features which will appear from the following description and upon examination of the drawing forming a part hereof. Drills containing the invention may partake of different forms and may be varied in their details and still embody the invention. To illustrate a practical application of the invention, I have selected a rock drill as an example of the various structures that contain the invention and shall describe the selected structure hereinafter, it being understood that certain features of my invention may be used to advantage without the use of other features of the invention and without departing from the spirit of the invention as hereinafter presented in the claims. The particular structure selected is shown in the accompanying drawing.

Fig. 1 of the drawing illustrates a perspective view of the rock drill, Fig. 2 illustrates an end view of the drill, and Fig. 3 illustrates a longitudinal section of the drill.

The particular form of drill selected for purposes of illustration and shown in the drawing comprises three parts, namely, the drill head 1, the shank 2 and the drill rod 3. The drill head 1 is provided with a central bore 4 extending axially through the head and the shank 2. The drill rod preferably has an enlarged end portion 7 that has a tapered socket 8. The shank 2 of the drill has a tapered surface for fitting the socket 8 to securely connect the drill to the drill rod 3 when the drill head is pressed into the socket 8. The socket wall of the drill rod may be provided with tapered holes 11 and a relatively large opening 14 may be formed in the shank 2 of the drill 1 and a tapered pin 15 fitting the holes 11 may be inserted into the holes and through the opening 14 to rotatably interconnect the drill head to the drill rod 3. The rod 3 is centrally bored as at 16 for conducting the water through the bore 4 of the drill head. The diameter of the hole 14 is much larger than the diameter of the pin 15, particularly at its central part, to allow free passage of water.

The drill is reciprocated and rotated to produce the drilling operation and any suitable means well known in the art is provided for reciprocating and rotating the drill.

The head 1 of the drill is formed of a single piece of block of metal. It is preferably conical in form and is provided with recesses that extend inwardly and toward the larger end of the head for enabling water flushing of the smaller particles of rock radially with respect to the working face or lower end of the drill. The chisel edges of the drill are formed by the intersection of sloping surfaces with vertically extending surfaces, herein described as axially extending surfaces, since they extend in the same direction as that of the axis of the drill. The recesses also form spaces for enabling surface grinding the radially extending surfaces for sharpening chisel edges formed at the lower ends of the said axially extending surfaces. Thus, the drill is provided with preferably four recesses 17 extending inwardly with respect to the conical outer surface portions 18. The recesses 17 are formed by substantially plane surfaces 20 that extend axially from the lower end of the drill head to near the upper end of the head and radially from near the center of the lower end of the drill and substantially plane surfaces 21 extending substantially at right angles to the surfaces 20 and sloping from near the upper end of the head toward the proximate vertical surfaces of contiguous recesses.

The lower edge portions of the drill head intermediate the recesses have cylindrical surfaces 22. The drill is provided with sloping surfaces 24, each having sloping surface portions 25 and 26. The surface portions 25 slope toward the radially and axially extending surface 20 and the surface portions 26 slope toward the cylindrical surface 22 forming rock cutting chisel edges 27 having radially extending portions 28 and circularly extending portions 29 that may be readily sharpened when desired by grinding the axially extending surfaces 20 and 22. The chisel edges 27 are preferably located in a common plane, and each chisel edge extends radially from near the axis of the drill to the outer lower edge of the drill and circularly along a part of the lower outer edge of the drill.

The inwardly and downwardly sloping surfaces 21, that extend from near the upper and smaller end of the conical head 1, terminate at their lower ends substantially in a line spaced from and substantially parallel to the proximate plane surface 20 of the contiguous recess and transversely extending substantially plane surfaces 30 are formed intermediate the said surfaces 20 and 21. Preferably, substantially rounded corner surfaces 33 join the sloping surfaces 21 and the surfaces 30, that is, rounded corners 33 are formed at the juncture of the surfaces 21 and 30. The surfaces 30 preferably extend at right angles to the axis of the drill head. They form crushing surfaces for crushing the larger portions of the rock that are dislodged by the cutting edges of the drill head in the operation of the drill. They are preferably located in a common plane and in a plane parallel to and above the cutting edges and form a space through which the smaller rock particles may be flushed by a stream of water that moves through the bores 16 and 4 of the drill rod and the drill head, over the surfaces 30, into the recesses 17, and upward from the conical drill head through the opening formed in the rock by the drill. The intersection of the bore 4 and the sloping surfaces 24 form recesses 31 along the edges of the bore 4 that direct the water flow into the space formed by the surface of the rock and the crushing surfaces 30.

I claim:

1. In a rock drill, a drill head having a plurality of substantially radially and axially extending surfaces and a plurality of sloping surfaces each extending substantially at right angles to a contiguous axially extending surface and sloping toward the axis of the drill and surfaces located substantially at right angles to the axis of the drill head and extending to the sloping surfaces and forming rock crushing surfaces, the drill having cylindrical surfaces and chisel rock-cutting edges extending along the said axially extending surfaces and the cylindrical surfaces.

2. In a rock drill, a drill head having substantially radially and axially extending surfaces and inwardly extending surfaces located substantially at right angles to the said radially and axially extending surfaces and inclined to the axis of the drill head and surfaces located substantially at right angles to the axis of the drill head and intermediate the axially extending surfaces and the inwardly inclined surfaces and extending from near the axially extending surfaces to the inwardly inclined surfaces and forming rock-crushing surfaces and cylindrical outer surface parts, and chisel edges located along the radially and axially extending surfaces and the cylindrical surface parts.

3. In a rock drill, a drill head having cylindrical surface parts and substantially radially and axially extending surfaces and inwardly extending surfaces located substantially at right angles to the said radially and axially extending surfaces and inclined to the axis of the drill head and surfaces located substantially at right angles to the axis of the drill head and intermediate the axially extending surfaces and the inwardly inclined surfaces and the cylindrical surface parts and extending to the inwardly inclined surfaces and forming rock-crushing surfaces and chisel edges extending radially along one side edge of each of the rock-crushing surfaces and circularly along each rock-crushing surface, and means for rotating the drill about its axis in a direction that extends from the radially extending chisel edge parts and across the rock-crushing surface and toward the inwardly inclined surface to which the rock-crushing surface extends.

4. In a rock drill, a drill head having conical outer surface parts and substantially radially and axially extending plane surfaces and inwardly extending substantially plane surfaces located substantially at right angles to the said radially and axially extending surfaces and inclined to the axis of the drill head and substantially plane surfaces located substantially at right angles to the axis of the drill head and intermediate the radially and axially extending surfaces and the inwardly inclined surfaces and extending to the inwardly inclined surfaces and forming rock-crushing surfaces and cylindrical outer surface parts, chisel edges located along the radially and axially extending surfaces and the side edges of the rock-crushing surfaces that extend along the said axially extending surfaces and the cylindrical surface parts, and the drill having a central bore for flushing water across the rock-crushing surface and to and upwardly along the inwardly inclined surfaces.

BERTIS H. URSCHEL.